(12) United States Patent
Yamashita et al.

(10) Patent No.: US 7,630,821 B2
(45) Date of Patent: Dec. 8, 2009

(54) INTAKE QUANTITY SENSING DEVICE OF INTERNAL COMBUSTION ENGINE

(75) Inventors: Hiroshi Yamashita, Kariya (JP); Hideki Suzuki, Chita-gun (JP)

(73) Assignee: Denso Corporation, Kariya (JP)

( * ) Notice: Subject to any disclaimer, the term of this patent is extended or adjusted under 35 U.S.C. 154(b) by 269 days.

(21) Appl. No.: 11/907,027

(22) Filed: Oct. 9, 2007

(65) Prior Publication Data

US 2008/0091333 A1 Apr. 17, 2008

(30) Foreign Application Priority Data

Oct. 16, 2006 (JP) .............................. 2006-280831

(51) Int. Cl.
*G06F 19/00* (2006.01)
*F02D 11/10* (2006.01)
*G01M 19/00* (2006.01)
(52) U.S. Cl. ..................... 701/103; 701/110; 73/114.33
(58) Field of Classification Search ................. 123/361, 123/396, 399, 403; 701/101–105, 110, 111, 701/115; 73/114.31–114.33, 114.37
See application file for complete search history.

(56) References Cited

U.S. PATENT DOCUMENTS

| 4,951,499 | A | * | 8/1990 | Akimoto | .................. 73/114.32 |
| 5,050,084 | A | * | 9/1991 | Nakaniwa | .................... 701/110 |
| 5,635,635 | A | * | 6/1997 | Tsukada et al. | .......... 73/114.34 |
| 6,390,063 | B1 | * | 5/2002 | Obata et al. | ................. 123/399 |
| 6,915,788 | B2 | | 7/2005 | Nakamura | |
| 7,219,002 | B2 | * | 5/2007 | Negishi et al. | .............. 701/103 |
| 2008/0097681 | A1 | * | 4/2008 | Nakano et al. | ............. 701/103 |
| 2008/0103667 | A1 | * | 5/2008 | Suzuki et al. | ................ 701/70 |

FOREIGN PATENT DOCUMENTS

| JP | 01147139 | A | * | 6/1989 | .............. 73/114.37 |
| JP | 02104930 | A | * | 4/1990 | .............. 73/114.37 |
| JP | 02191853 | A | * | 7/1990 | .............. 73/114.33 |
| JP | 09252600 | A | * | 9/1997 | ................ 123/399 |
| WO | 03/033896 | | | 4/2003 | |

* cited by examiner

*Primary Examiner*—Willis R Wolfe, Jr.
(74) *Attorney, Agent, or Firm*—Nixon & Vanderhye, PC (57) ABSTRACT

An intake pressure sensor is provided in an intake manifold of a first cylinder. During steady operation, intake quantities of respective cylinders are sensed with an airflow meter provided in an intake pipe of an engine, and the intake quantity of the first cylinder is compared with the intake quantities of the other cylinders to obtain intake pressure variation correction coefficients of the other cylinders. Also, average intake pressure of the first cylinder is corrected with the intake pressure variation correction coefficients to calculate average intake pressures of the other cylinders. During transient operation, estimation intake pressure is anticipated from a target opening degree of an intake throttle valve with the use of a physics model. Intake quantities of the respective cylinders are calculated with the use of the estimation intake pressure and the intake pressure variation correction coefficients.

4 Claims, 5 Drawing Sheets

INTAKE QUANTITY SENSING DEVICE OF INTERNAL COMBUSTION ENGINE

CROSS REFERENCE TO RELATED APPLICATION

This application is based on and incorporates herein by reference Japanese Patent Application No. 2006-280831 filed on Oct. 16, 2006.

BACKGROUND OF THE INVENTION

1. Field of the Invention

The present invention relates to an intake quantity sensing device of an internal combustion engine.

2. Description of Related Art

For example, as described in the international publication pamphlet No. 03/033896, there is an air intake quantity sensing device that has intake pressure sensors in intake pipes of respective cylinders of an internal combustion engine for sensing air intake pressure and that calculates air intake quantities of the respective cylinders based on the intake pressure sensed with the intake pressure sensors of the respective cylinders. When intake pressure difference as a difference between a present value and a previous value of the intake pressure becomes equal to or greater than a predetermined value, the device determines that an acceleration state occurs and calculates an acceleration period fuel injection quantity in accordance with the intake pressure difference and engine rotation speed.

The above-described technology uses the intake pressure sensors provided for the respective cylinders of the engine. Therefore, it is necessary to provide the intake pressure sensors of the same number as the number of the cylinders, increasing the cost correspondingly. Specifically, in recent years, the number of the cylinders of the engine tends to increase, causing the problem of the increase in the range of the cost increase according to the increase in the number of the sensors.

A delay occurs between a time when a throttle opening degree changes during transient operation of the engine and a time when an output of the intake pressure sensor changes. The above-described technology calculates the intake quantities of the respective cylinders based on the intake pressure sensed with the intake pressure sensors without discriminating between a steady operation period and a transient operation period of the engine. Therefore, the intake quantity (in-cylinder filling air quantity), which changes in retard of the change of the throttle opening degree during the transient operation, cannot be calculated with sufficient accuracy. The technology merely calculates the fuel injection quantity at the time of the acceleration according to the intake pressure difference and the engine rotation speed at the time of the acceleration determination. Therefore, air-fuel ratio controllability during the transient operation cannot be improved sufficiently.

SUMMARY OF THE INVENTION

It is an object of the present invention to provide an intake quantity sensing device of an internal combustion engine capable of sensing intake quantities of respective cylinders with high accuracy while satisfying demand for cost reduction and of improving air fuel ratio controllability during transient operation in a system having intake throttle valves in intake passages of respective cylinders of the engine.

According to an aspect of the present invention, an intake quantity sensing device of an internal combustion engine having branch intake passages, which branch from a main intake passage and introduce an intake air into respective cylinders, and intake throttle valves in the branch intake passages of the respective cylinders for adjusting intake quantities respectively has an intake pressure sensor provided in the branch intake passage of a specific cylinder out of the branch intake passages of the cylinders for sensing intake pressure downstream of the intake throttle valve, an intake quantity sensor provided in the main intake passage for sensing the intake quantity, a steady period intake quantity sensing device that senses the intake quantity of each cylinder with the intake quantity sensor during steady operation of the engine, an intake pressure variation sensing device that senses information about intake pressure variation among the respective cylinders based on the intake quantities of the cylinders sensed with the intake quantity sensor during the steady operation of the engine, and a transient period intake quantity sensing device that estimates the intake pressure downstream of the intake throttle valve during transient operation of the engine based on an opening degree of the intake throttle valve and the intake pressure sensed with the intake pressure sensor during immediately preceding steady operation and that calculates the intake quantities of the respective cylinders based on the estimated intake pressure and the information about the intake pressure variation.

With this scheme, the intake quantity of each cylinder can be sensed with high accuracy with the intake quantity sensor (for example, airflow meter) arranged in the main intake passage during the steady operation of the engine.

There is a delay between a time when the opening degree of the intake throttle valve changes in the transient operation of the engine and a time when the output of the intake quantity sensor provided in the main intake passage changes. Therefore, it is difficult to accurately sense the intake quantity (in-cylinder filling air quantity), which changes in retard of the change of the opening degree of the intake throttle valve, with the intake quantity sensor during the transient operation of the engine.

Therefore, with the scheme of the present invention, information about intake pressure variation among the cylinders is sensed first based on the intake quantities of the respective cylinders sensed with the intake quantity sensor during steady operation of the engine. The intake quantity varies among the cylinders in accordance with the variation among the intake pressures of the respective cylinders. Therefore, by using the intake quantities of the respective cylinders sensed with the intake quantity sensor during the steady operation of the engine, the information about the intake pressure variation among the cylinders and information about intake pressure variation among the cylinders can be sensed with high accuracy.

During the transient operation of the engine, the intake pressure downstream of the intake throttle valve is estimated based on the opening degree of the intake throttle valve and the intake pressure sensed with the intake pressure sensor during the immediately preceding steady operation. The intake quantity of each cylinder is calculated based on the estimated intake pressure and the information about the intake pressure variation. Thus, the intake pressure can be estimated with high accuracy from the opening degree of the intake throttle valve. Furthermore, the estimated intake pressure can be converted into the intake quantities of the respective cylinders by using the estimated intake pressure and the information about the intake pressure variation. As a result, the intake quantities of the respective cylinders can be calculated with high accuracy. Thus, the intake quantity of each cylinder, which changes in retard of the change of the opening degree of the intake throttle valve during the transient operation of the engine, can be sensed with high accuracy, and the air fuel ratio controllability during the transient operation can be improved.

Moreover, the scheme of the present invention does not require the intake pressure sensors of the same number as the number of the cylinders. The scheme only requires providing the intake pressure sensor in the branch intake passage of the specific cylinder and providing the intake quantity sensor in the main intake passage. Thus, the demand for the cost reduction is satisfied.

BRIEF DESCRIPTION OF THE DRAWINGS

Features and advantages of an embodiment will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENT

Figure 1:
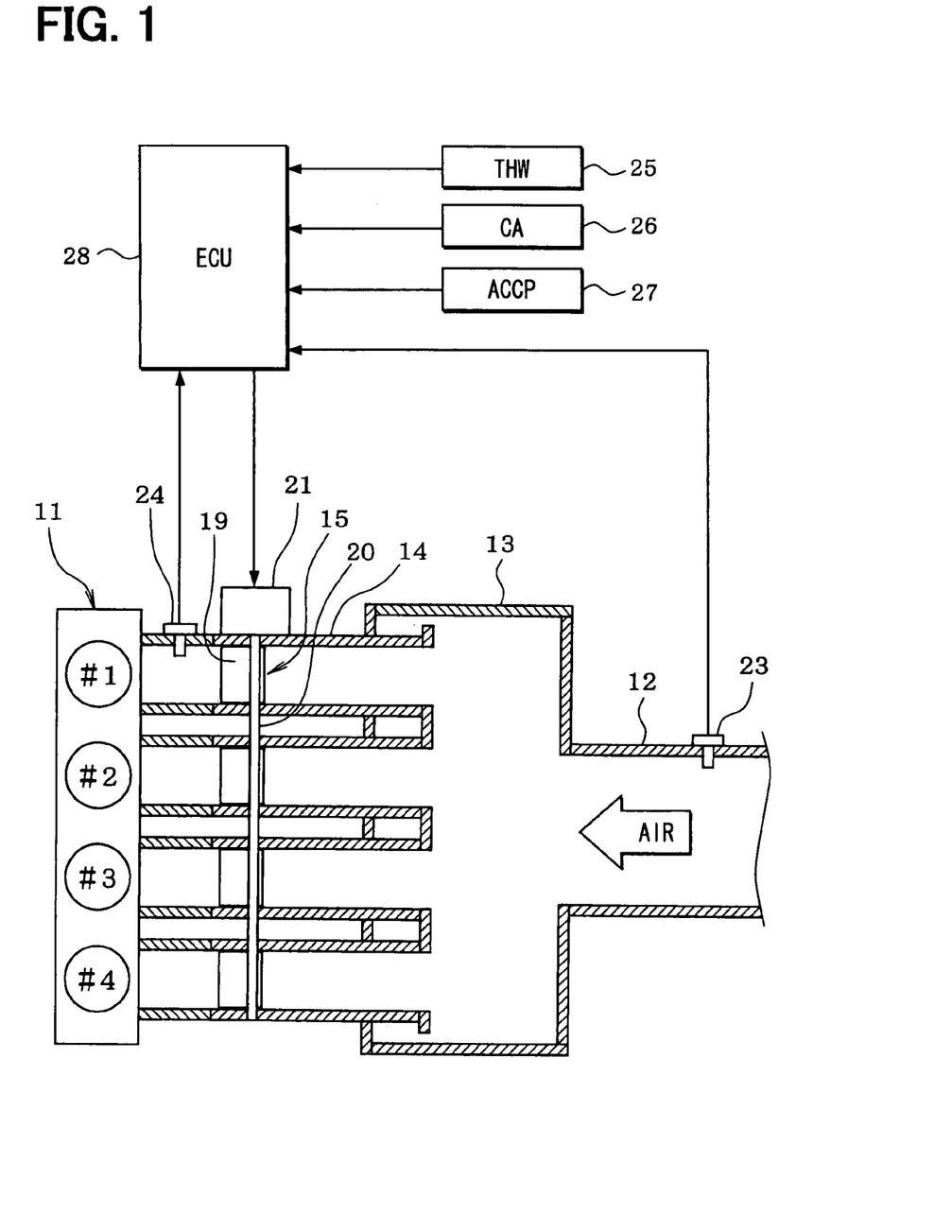
FIG. 1 is a schematic diagram showing an engine control system according to an embodiment of the present invention.

Referring to FIG. 1, an embodiment of the present invention is illustrated. First, an outline of an engine intake system will be explained in reference to FIG. 1. An internal combustion engine 11, e.g., an in-line four-cylinder engine, has four cylinders of a first cylinder #1 to a fourth cylinder #4 and an airflow meter 23 (intake quantity sensor) in an intake pipe 12 (main intake passage) of the engine 11 for sensing an intake quantity. A surge tank 13 is provided downstream of the airflow meter 23, and intake manifolds 14 (branch intake passages) for introducing an air into respective cylinders of the engine 11 are provided in the surge tank 13. Intake throttle valve units 15 are attached to the intake manifolds 14 of the respective cylinders, and an intake pressure sensor 24 for sensing intake pressure downstream of the intake throttle valve unit 15 is provided in the intake manifold 14 of the first cylinder #1. Injectors (not shown) for injecting fuel are attached near intake ports of the respective cylinders. Spark plugs (not shown) are attached to a cylinder head of the engine 11 for the respective cylinders to ignite a fuel-air mixture in the cylinders with spark discharges generated by the respective spark plugs.

A coolant temperature sensor 25 for sensing coolant temperature THW and a crank angle sensor 26 for outputting a pulse signal every time a crankshaft of the engine 11 rotates by a specific crank angle are attached to the cylinder block of the engine 11. A crank angle CA and engine rotation speed are sensed based on the output signal of the crank angle sensor 26. An accelerator operation amount ACCP (stepped amount of accelerator) is sensed with an accelerator sensor 27.

Figure 2:
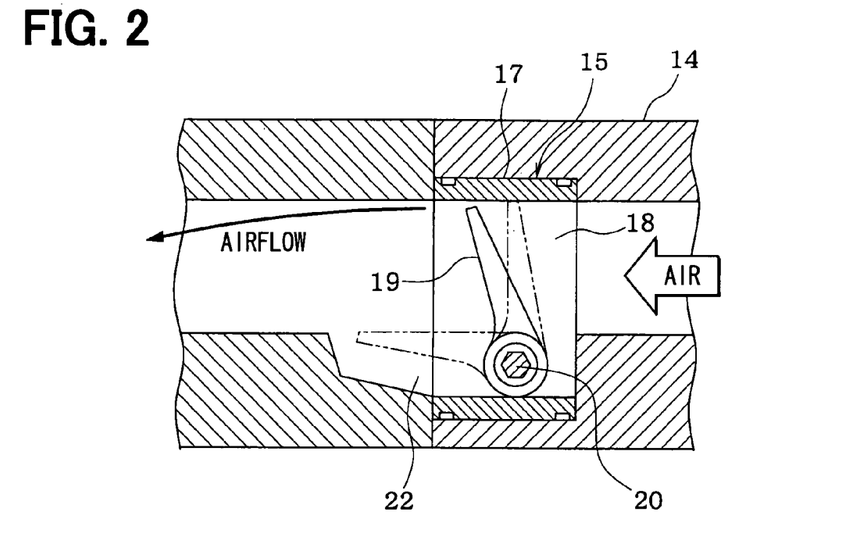
FIG. 2 is a longitudinal cross-sectional view showing an intake throttle valve unit and proximity thereof according to the embodiment.

Next, a structure of the intake throttle valve unit 15 will be explained based on FIG. 2. In the intake throttle valve unit 15 of each cylinder, an intake passage 18 having a cross section substantially in the shape of a quadrangle is defined in a housing 17 made of a resin. An intake throttle valve 19 of a cantilever type for opening/closing the intake passage 18 is provided in the intake passage 18. The intake throttle valve 19 rotates as opening/closing motion around a shaft 20, which is connected to the lower end of the intake throttle valve 19. Each intake throttle valve 19 is formed in the shape (substantially quadrangular shape in the present embodiment) corresponding to the cross-sectional shape of the intake passage 18. The cross-sectional shape of the intake passage 18 and the shape of the intake throttle valve 19 are not limited to the substantially quadrangular shape but may be any other shape such as a substantially semicircular shape or a substantially half-elliptical shape.

The intake throttle valves 19 of the respective cylinders are connected with a common shaft 20 and can rotate integrally. Opening degrees of the intake throttle valves 19 of the respective cylinders are controlled through control of a motor 21 (shown in FIG. 1) connected with the shaft 20 according to an engine operation state (accelerator operation amount ACCP and the like). Alternatively, the intake throttle valves 19 of the respective cylinders may be mechanically linked with an accelerator and may be driven to open or close in conjunction with the accelerator operation.

The intake throttle valve 19 of each cylinder is provided so that the end (lower end) on the shaft 20 side contacts (or is close to) an inner wall face of the housing 17 and the intake air can hardly pass through the clearance below the intake throttle valve 19. When the intake throttle valve 19 is opened, a flow passage of the intake air (gap from inner wall face of housing 17) is formed only on an upper side of the intake throttle valve 19, and a flow passage sectional area on the upper side of the intake throttle valve 19 changes in accordance with the opening degree of the intake throttle valve 19. A storage concave portion 22 for storing the intake throttle valve 19 when the intake throttle valve 19 is fully opened is formed in the housing 17 and the proximity thereof. Thus, the intake throttle valve 19 does not hinder the flow of the intake air when the intake throttle valve 19 is fully opened.

The outputs of the above-described sensors are inputted into a control circuit 28 (ECU). The ECU 28 has a microcomputer as a main component. The ECU 28 executes various kinds of engine control programs stored in an incorporated ROM (storage medium) to control a fuel injection quantity of the injector and ignition timing of the spark plug in accordance with the engine operation state. The ECU 28 calculates a target opening degree of the intake throttle valve 19 based on the accelerator operation amount ACCP sensed with the accelerator sensor 27 and the like and controls the motor 21 of the intake throttle valve 19 to coincide an actual opening degree of the intake throttle valve 19 with the target opening degree. The ECU 28 executes an in-cylinder intake quantity calculation program shown in FIGS. 4 and 5 to calculate an in-cylinder intake quantity of each cylinder as follows.

Figure 3:
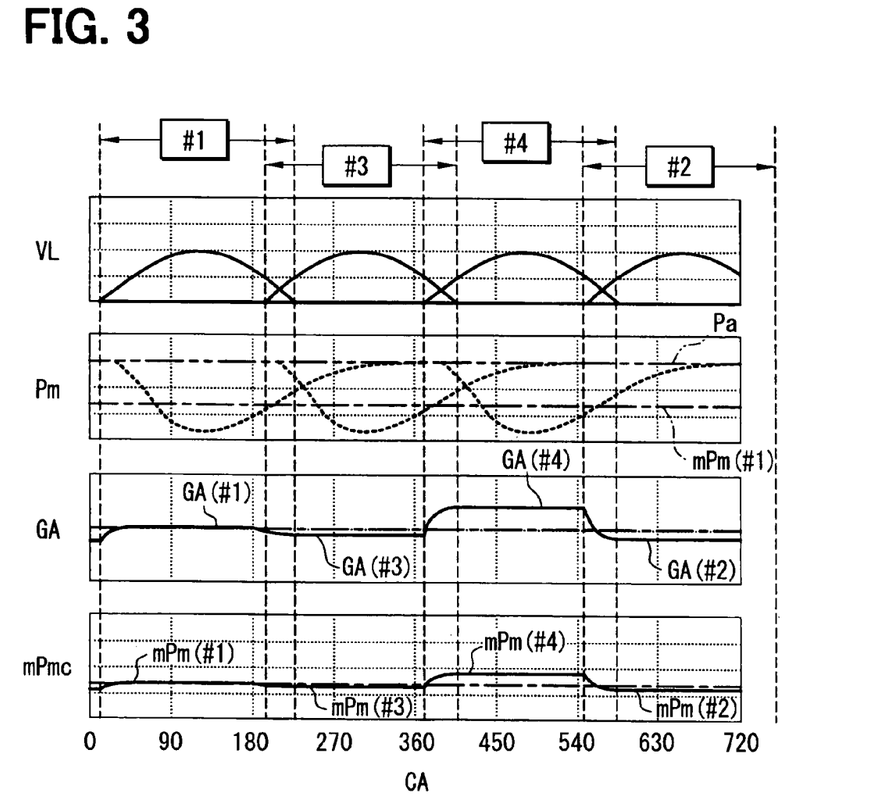
FIG. 3 is a time chart for explaining a calculation method of an in-cylinder, intake quantity according to the embodiment.

As shown in a time chart of FIG. 3, during a steady operation of the engine 11, the in-cylinder intake quantities GA(#1)-GA(#4) in intake strokes of the respective cylinders (first cylinder #1 to fourth cylinder #4) are sensed based on the output of the airflow meter 23. In FIG. 3, VL represents a valve lift amount and Pa is the atmospheric pressure.

Intake pressure variation correction coefficients H(#2)-H(#4) of the second cylinder #2 to the fourth cylinder #4 are obtained through comparison between the in-cylinder intake quantity GA(#1) of the first cylinder #1 and the in-cylinder intake quantities GA(#2)-GA(#4) of the other cylinders (second cylinder #2 to fourth cylinder #4) sensed with the airflow meter 23 during the steady operation of the engine 11.

Average intake pressure mPm(#1) during the intake stroke of the first cylinder #1 (for example, valve opening period of intake valve) is calculated based on the intake pressure Pm of the first cylinder #1 sensed with the intake pressure sensor 24 in the steady operation of the engine 11. The average intake pressure mPm(#1) in the intake stroke of the first cylinder #1 is corrected with the intake pressure variation correction coefficients H(#2)-H(#4) of the other cylinders (second cylinder #2 to fourth cylinder #4) to calculate average intake pressures mPm(#2)-mPm(#4) in the intake strokes of the other cylinders (second cylinder #2 to fourth cylinder #4).

Then, average intake pressure mPmc of each cylinder during the steady operation is calculated by following Formula (1).

$$mPmc = a(\#1) \times mPm(\#1) + a(\#2) \times mPm(\#2) + a(\#3) \times mPm(\#3) + a(\#4) \times mPm(\#4) \quad \text{Formula (1)}$$

The value $\alpha(\#i)$ (i=1 to 4) is 1 ($\alpha(\#i)$=1) during the intake stroke of the i-th cylinder #i and is 0 ($\alpha(\#i)$=0) during the other period.

That is, the average intake pressure mPmc is calculated by following Formula (2) in the intake strokes of the first cylinder #1 to the fourth cylinder #4.

$mPmc=mPm(\#1)$(during intake stroke of cylinder #1), $mPmc=mPm(\#2)$(during intake stroke of cylinder #2), $mPmc=mPm(\#3)$(during intake stroke of cylinder #3), $mPmc=mPm(\#4)$(during intake stroke of cylinder #4) Formula (2)

During the transient operation of the engine 11, future estimation intake pressure Pme downstream of the intake throttle valve 19 is first anticipated from the target opening degree of the intake throttle valve 19 with the use of a physics model (for example, formula of orifice). At this time, the average intake pressure mPmc estimated during the immediately preceding steady operation is used as an initial value Pme (0) of the estimation intake pressure to improve estimation accuracy of the estimation intake pressure Pme.

Then, an in-cylinder intake quantity mc of each cylinder as of the transient operation is calculated by following Formula (3) using the estimation intake pressure Pme and an intake pressure variation correction coefficient H.

$$mc = \{a(\#1) \times 1 + a(\#2) \times H(\#2) + a(\#3) \times H(\#3) + a(\#4) \times H(\#4)\} / H(\#n) \times GRAND \times Pme - GA0 \quad \text{Formula (3)}$$

Figure 6:
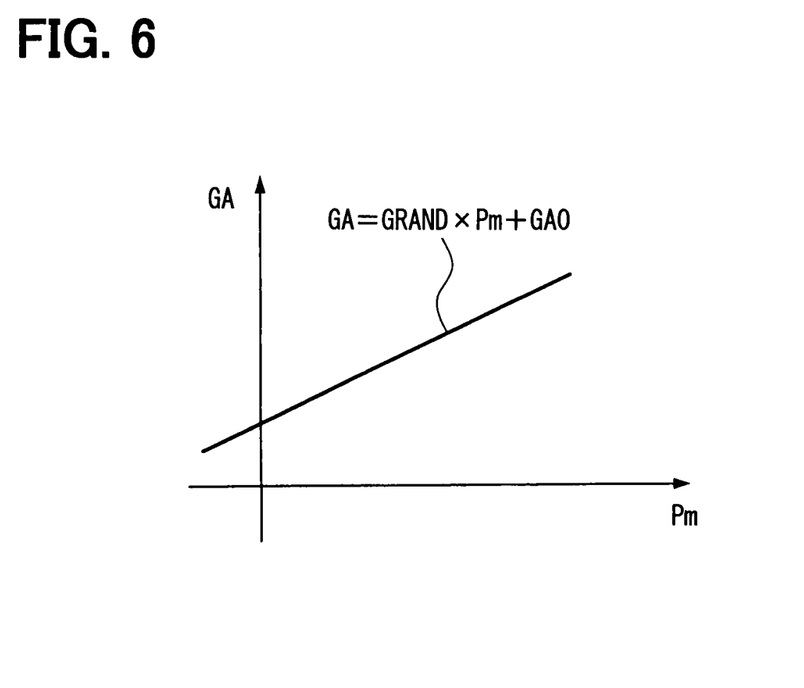
FIG. 6 is a diagram schematically showing a map (linear expression) defining a relationship between intake pressure and the in-cylinder intake quantity according to the embodiment.

GRAND and GA0 are an inclination GRAND and a section GA0 of a linear expression (map) defining a relationship between the intake pressure Pm and the in-cylinder intake quantity GA shown in FIG. 6. The value n is the cylinder number of the average intake pressure mPmc used as the initial value Pme(0) of the estimation intake pressure.

That is, the in-cylinder intake quantity mc is calculated by following Formula (4) in the intake strokes of the first cylinder #1 to the fourth cylinder #4.

$mc=1/H(\#n)\times GRAND \times Pme-GA0$(during intake stroke of cylinder #1), $mc=H(\#2)/H(\#n)\times GRAND \times Pme-GA0$(during intake stroke of cylinder #2), $mc=H(\#3)/H(\#n)\times GRAND \times Pme-GA0$(during intake stroke of cylinder #3), $mc=H(\#4)/H(\#n)\times GRAND \times Pme-GA0$(during intake stroke of cylinder #4) Formula (4)

Figure 4:
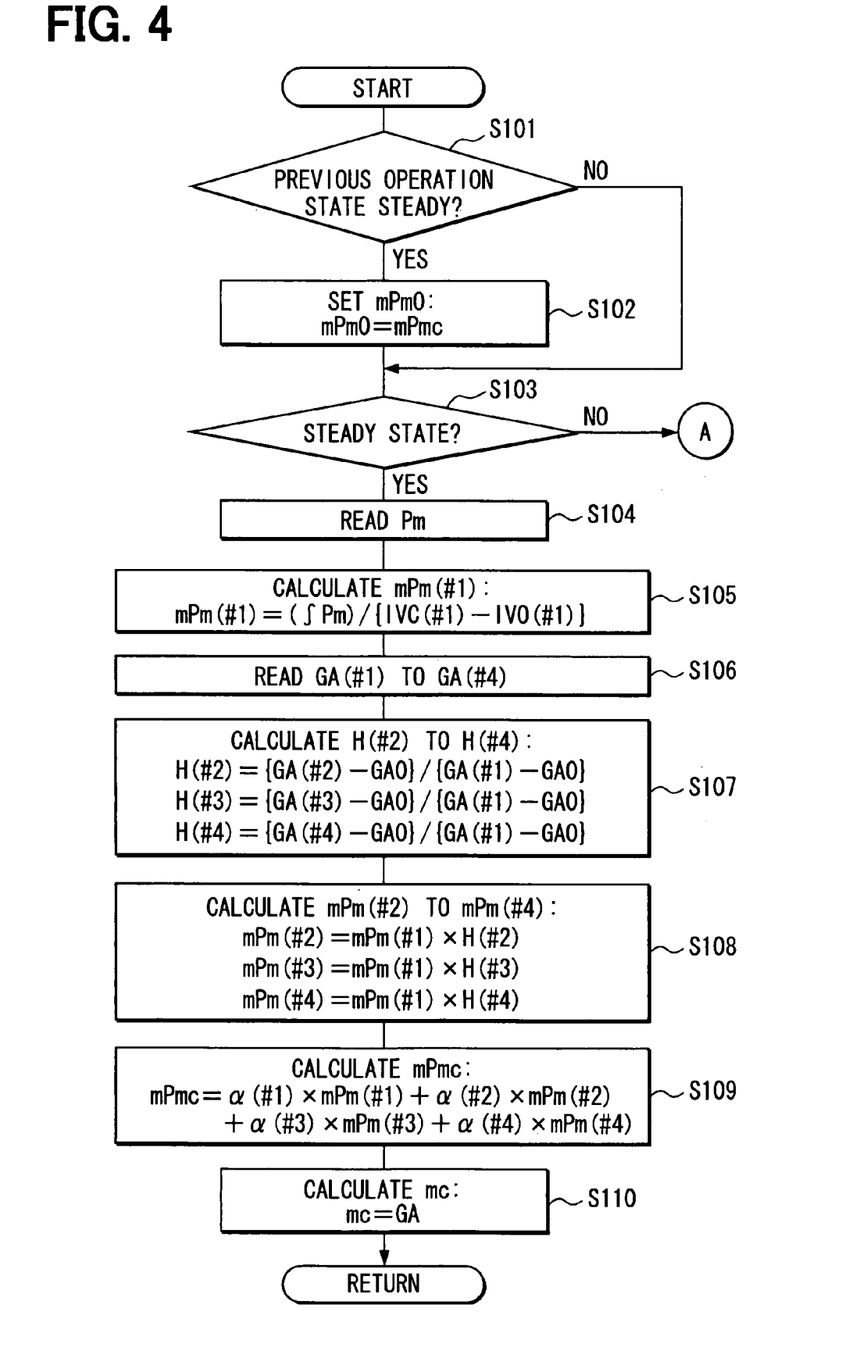
FIG. 4 is a first flowchart showing a flow of processing of an in-cylinder intake quantity calculation program according to the embodiment.
Figure 5:
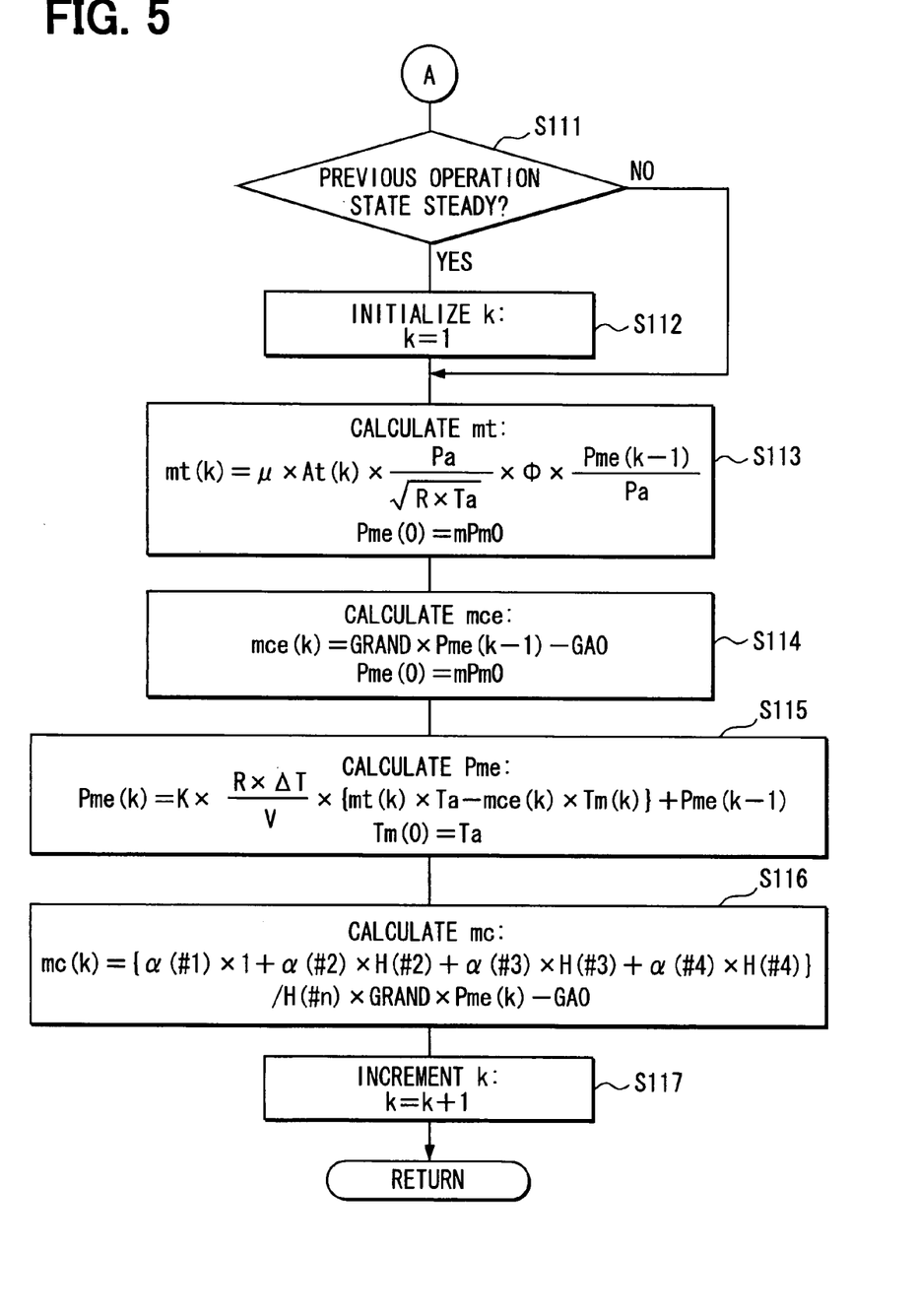
FIG. 5 is a second flowchart showing the flow of the processing of the in-cylinder intake quantity calculation program according to the embodiment.

The above-described in-cylinder intake quantity calculation processing of the present embodiment is performed by the ECU 28 based on an in-cylinder intake quantity calculation program shown in FIGS. 4 and 5.

Next, the processing contents of the program of FIGS. 4 and 5 will be explained. The in-cylinder intake quantity calculation program shown in FIGS. 4 and 5 is executed in a predetermined cycle while the ECU 28 is energized. If the program is started, first, S101 determines whether the previous engine operation state is the steady state based on at least one of the accelerator operation amount ACCP, the engine rotation speed, the intake quantity GA, the intake pressure Pm and the like. If S101 determines that the previous engine operation state is the steady state, the processing proceeds to S102 to set the present average intake pressure mPmc as an initial value mPm0 of the estimation intake pressure as of the transient operation (i.e., mPm0=mPmc).

Then, the processing proceeds to S103 to determine whether the present engine operation state is the steady state. If S103 determines that the present engine operation state is the steady state, the processing proceeds to S104. S104 reads the intake pressure Pm of the first cylinder #1 sensed with the intake pressure sensor 24. Then, processing proceeds to S105. S105 calculates the average intake pressure mPm(#1) in the intake stroke of the first cylinder #1 by dividing the integration value ($\int Pm$) of the intake pressure Pm in the intake stroke (for example, valve opening period of intake valve) of the first cylinder #1 by the length of the intake stroke (IVC(#1)–IVO (#1)) (i.e., mPm(#1)=($\int Pm$)/{IVC(#1)–IVO(#1)}). The value IVO(#1) is valve opening timing of an intake valve of the first cylinder #1, and the value IVC(#1) is valve closing timing of the intake valve of the first cylinder #1.

Then, the processing proceeds to S106 to calculate the in-cylinder intake quantities GA(#1)-GA(#4) in the intake strokes of the respective cylinders (first cylinder #1 to fourth cylinder #4) based on the output of the airflow meter 23. Then, the processing proceeds to S107. S107 calculates the intake pressure variation correction coefficients H(#2)-H(#4) of the second cylinder #2 to the fourth cylinder #4 by following Formula (5) by using the intake quantity GA(#1) of the first cylinder #1 and the intake quantities GA(#2)-GA(#4) of the other cylinders (second cylinder #2 to fourth cylinder #4) sensed with the airflow meter 23.

$H(\#2)=\{GA(\#2)-GA0\}/\{GA(\#1)-GA0\}$, $H(\#3)=\{GA(\#3)-GA0\}/\{GA(\#1)-GA0\}$, $H(\#4)=\{GA(\#4)-GA0\}/\{GA(\#1)-GA0\}$ Formula (5)

The section GA0 of the linear expression (FIG. 6) defining the relationship between the intake pressure Pm and the in-cylinder intake quantity GA is calculated based on a map or a formula in accordance with the engine rotation speed, the intake valve timing and the like.

Then, processing proceeds to S108. S108 corrects the average intake pressure mPm(#1) as of the intake stroke of the first cylinder #1 with the intake pressure variation correction coefficients H(#2)-H(#4) of the other cylinders (second cylinder #2 to fourth cylinder #4) to calculate the average intake pressures mPm(#2)-mPm(#4) in the intake strokes of the other cylinders (second cylinder #2 to fourth cylinder #4) as shown by following Formula (6).

$$mPm(\#2) = mPm(\#1) \times H(\#2),$$

$$mPm(\#3) = mPm(\#1) \times H(\#3),$$

$$mPm(\#4) = mPm(\#1) \times H(\#4) \quad \text{Formula (6)}$$

Then, the processing proceeds to S109 to calculate the average intake pressure mPmc of each cylinder as of the steady operation by following formula (7).

$$mPmc = a(\#1) \times mPm(\#1) + a(\#2) \times mPm(\#2) + \\ a(\#3) \times mPm(\#3) + a(\#4) \times mPm(\#4) \quad \text{Formula (7)}$$

The value α(#i) is 1 (α(#i)=1) when the crank angle CA is in the intake stroke period (IVO(#i)≦CA≦IVC (#i)) of the i-th cylinder #i and is 0 (α(#i)=0) when the crank angle CA is in the other periods (CA<IVO(#i), IVC(#i)<CA).

That is, the average intake pressure mPmc is calculated by following Formula (8) in the intake strokes of the first cylinder #1 to the fourth cylinder #4.

$$mPmc = mPm(\#1)(\text{during intake stroke of cylinder } \#1),$$

$$mPmc = mPm(\#2)(\text{during intake stroke of cylinder } \#2),$$

$$mPmc = mPm(\#3)(\text{during intake stroke of cylinder } \#3),$$

$$mPmc = mPm(\#4)(\text{during intake stroke of cylinder } \#4) \quad \text{Formula (8)}$$

Then, the processing proceeds to S110 to set the in-cylinder intake quantity GA sensed with the airflow meter 23 as the in-cylinder intake quantity mc of the steady operation (mc=GA).

After that, when S103 determines that the present engine operation state is the transient state, the processing proceeds to S111 of FIG. 5 to determine whether the previous engine operation state is the steady state. When it is determined that the previous engine operation state is the steady state (that is, in case of first computation cycle after engine operation state is determined to be transient state), the processing proceeds to S112 to reset a counting value k of a transient computation counter to an initial value (for example, 1, i.e., k=1).

Figure 7:
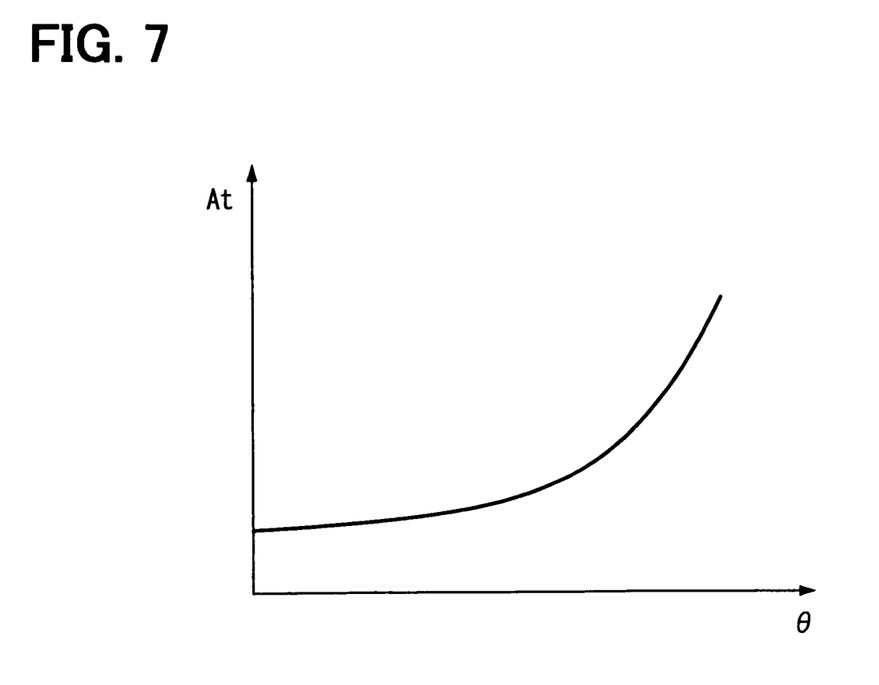
FIG. 7 is a diagram schematically showing a map defining a relationship between an opening degree and a flow passage sectional area of an intake throttle valve according to the embodiment.

Then, the processing proceeds to S113. S113 calculates a flow passage sectional area At corresponding to the present target opening degree of the intake throttle valve 19 with reference to a map of the flow passage sectional area At and the opening degree θ of the intake throttle valve unit 15 shown in FIG. 7 and calculates a quantity mt of an air passing through the intake throttle valve 19 using a physics model (for example, formula of orifice) based on the flow passage sectional area At as shown by following Formula (9).

$$mt(k) = \mu \times At(k) \times \frac{Pa}{\sqrt{R \times Ta}} \times \Phi \times \frac{Pme(k-1)}{Pa} \quad \text{Formula (9)}$$

In Formula (9), μ is a flow rate coefficient, Pa is the atmospheric pressure, R is the gas constant, and Ta is ambient temperature. An initial value Pme(0) of the estimation intake pressure is set at mPm0 (average intake pressure mPmc estimated during immediately preceding steady operation).

Then, S114 calculates an estimation in-cylinder intake quantity mce(k) by following Formula (10).

$$mce(k) = GRAND \times Pme(k-1) - GA0 \quad \text{Formula (10)}$$

GRAND, GA0 in Formula (10) are the inclination GRAND and the section GA0 of the linear expression (map) defining the relationship between the intake pressure Pm and the in-cylinder intake quantity GA shown in FIG. 6.

Then, the processing proceeds to S115 to calculate estimation intake pipe pressure Pme(k) by following Formula (11).

$$Pme(k) = \\ \kappa \times \frac{R \times \Delta T}{V} \times \{mt(k) \times Ta - mce(k) \times Tm(k)\} + Pme(k-1) \quad \text{Formula (11)}$$

In Formula (11), K is the specific heat ratio, V is an intake pipe capacity, and Tm is intake air temperature. An initial value Tm(0) of the intake air temperature Tm is set at ambient temperature Ta.

Then, the processing proceeds to S116 to calculate the in-cylinder intake quantity mc of each cylinder as of the transient operation by following Formula (12) using the estimation intake pressure Pme and the intake pressure variation correction coefficient H.

$$mc(k) = \{a(\#1) \times 1 + a(\#2) \times H(\#2) + a(\#3) \times H(\#3) + \\ a(\#4) \times H(\#4)\} / H(\#n) \times GRAND \times Pme(k) - GA0 \quad \text{Formula (12)}$$

In Formula (12), GRAND and GA0 are the inclination GRAND and the section GA0 of the linear expression (map) defining the relationship between the intake pressure Pm and the in-cylinder intake quantity GA shown in FIG. 6. The value n is the cylinder number of the average intake pressure mPmc used as the initial value Pme(0) of the estimation intake pressure.

That is, the in-cylinder intake quantity mc is calculated by following Formula (13) in the intake strokes of the first cylinder #1 to the fourth cylinder #4.

$$mc = 1/H(\#n) \times GRAND \times Pme - GA0(\text{during intake stroke of cylinder } \#1),$$

$$mc = H(\#2)/H(\#n) \times GRAND \times Pme - GA0(\text{during intake stroke of cylinder } \#2),$$

$$mc = H(\#3)/H(\#n) \times GRAND \times Pme - GA0(\text{during intake stroke of cylinder } \#3),$$

$$mc = H(\#4)/H(\#n) \times GRAND \times Pme - GA0(\text{during intake stroke of cylinder } \#4) \quad \text{Formula (13)}$$

Then, the processing proceeds to S117 to count up the count value k of the transient computation counter by one (k=k+1)

In the above-described embodiment, during the steady operation of the engine 11, the in-cylinder intake quantities GA(#1)-GA(#4) of the respective cylinders (first cylinder #1 to fourth cylinder #4) can be sensed with the airflow meter 23. The intake pressure variation correction coefficients H(#2)-H(#4) of the second cylinder #2 to the fourth cylinder #4 are obtained through comparison between the in-cylinder intake quantity GA(#1) of the first cylinder #1 and the in-cylinder intake quantities GA(#2)-GA(#4) of the other cylinders (second cylinder #2 to fourth cylinder #4) sensed with the airflow meter 23 during the steady operation of the engine 11. In addition, the average intake pressure mPm(#1) during the intake stroke of the first cylinder #1 is calculated based on the intake pressure Pm of first cylinder #1 sensed with the intake pressure sensor 24 in the steady operation of the engine 11. The average intake pressure mPm(#1) in the intake stroke of the first cylinder #1 is corrected with the intake pressure variation correction coefficients H(#2)-H(#4) of the second cylinder #2 to the fourth cylinder #4 to calculate the average intake pressures mPm(#2)-mPm(#4) in the intake strokes of the second cylinder r#2 to the fourth cylinder #4.

In the transient operation of the engine 11, the average intake pressure estimated in the immediately preceding steady operation period is used as the initial value Pme(0) of the estimation intake pressure and the future estimation intake pressure Pme downstream of the intake throttle valve 19 is anticipated from the target opening degree of the intake throttle valve 19 with the use of the physics model (for example, formula of orifice and the like). The in-cylinder intake quantity of each cylinder is calculated by using the anticipated estimation intake pressure Pme and the intake pressure variation correction coefficient H. Thus, the in-cylinder intake quantity (in-cylinder filling air quantity) of each cylinder, which changes in retard of the change of the opening degree of the intake throttle valve 19 during the transient operation of the engine 11, can be anticipated with high accuracy and suitable response. As a result, the air-fuel ratio controllability during the transient operation period is improved.

Moreover, there is no need to provide the intake pressure sensors 24 of the same number as the number of the cylinders in the present embodiment. It is only necessary to provide the intake pressure sensor 24 in the intake manifold 14 of the first cylinder #1 and the airflow meter 23 in the intake pipe 12. Thus, the demand for cost reduction can be satisfied.

In the present embodiment, the average intake pressure mPm(#1) in the intake stroke of the first cylinder #1 is calculated based on the intake pressure Pm of the first cylinder #1 sensed with the intake pressure sensor 24 during the steady operation of the engine 11. The average intake pressure mPm(#1) in the intake stroke of the first cylinder #1 is corrected with the intake pressure variation correction coefficients H(#2)-H(#4) of the second cylinder #2 to fourth cylinder #4 to calculate the average intake pressures mPm(#2)-mPm(#4) in the intake strokes of the second cylinder #2 to the fourth cylinder #4. Accordingly, the average intake pressure of each cylinder can be estimated with high accuracy by comparatively easy computation processing.

Furthermore, in the present embodiment, when anticipating the estimation intake pressure Pme of the intake throttle valve 19 from the target opening degree of the intake throttle valve 19 in the transient operation of the engine 11, the average intake pressure estimated in the immediately preceding steady operation is used as the initial value Pme(0) of the estimation intake pressure. Thus, the estimation accuracy of the estimation intake pressure Pme can be improved.

In the above-described embodiment, the estimation intake pressure is estimated from the target opening degree of the intake throttle valve 19 in the transient operation of the engine 11. Alternatively, the estimation intake pressure may be estimated from the actual opening degree of the intake throttle valve 19. The method for estimating the estimation intake pressure may be modified suitably and arbitrarily.

In the above-described embodiment, the intake pressure sensor 24 is arranged downstream of the intake throttle valve 19 of the first cylinder #1. Alternatively, the intake pressure sensor 24 may be arranged downstream of the intake throttle valve 19 of any one of the other cylinders (one out of second cylinder #2 to fourth cylinder #4). Alternatively, multiple intake pressure sensors 24 may be arranged downstream of the intake throttle valves 19 of two or more cylinders selected from all the cylinders.

In the above-described embodiment, the present invention is applied to the four-cylinder engine. The present invention may be applied to a two-cylinder engine, a three-cylinder engine, or an engine having five cylinders or more.

In the above-described embodiment, the present invention is applied to the intake port injection engine. Alternatively, the present invention may be applied to an in-cylinder injection engine (i.e., direct injection engine) or a dual injection engine having injectors in both of an intake port and a cylinder.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. An intake quantity sensing device of an internal combustion engine having branch intake passages, which branch from a main intake passage and introduce an intake air into respective cylinders, and intake throttle valves in the branch intake passages of the respective cylinders for adjusting intake quantities respectively, the intake quantity sensing device comprising:

an intake pressure sensor provided in the branch intake passage of a specific cylinder out of the branch intake passages of the cylinders for sensing intake pressure downstream of the intake throttle valve;

an intake quantity sensor provided in the main intake passage for sensing the intake quantity;

a steady period intake quantity sensing device that senses the intake quantity of each cylinder with the intake quantity sensor during steady operation of the engine;

an intake pressure variation sensing device that senses information about intake pressure variation among the respective cylinders based on the intake quantities of the cylinders sensed with the intake quantity sensor during the steady operation of the engine; and a transient period intake quantity sensing device that estimates the intake pressure downstream of the intake throttle valve during transient operation of the engine based on an opening degree of the intake throttle valve and the intake pressure sensed with the intake pressure sensor during immediately preceding steady operation and that calculates the intake quantities of the respective cylinders based on the estimated intake pressure and the information about the intake pressure variation.

2. The intake quantity sensing device as in claim 1, further comprising:
an each cylinder intake pressure estimation device that estimates the intake pressure of each cylinder based on the intake pressure sensed with the intake pressure sensor during the steady operation of the engine and the information about the intake pressure variation, wherein
the transient period intake quantity sensing device uses the intake pressure estimated with the each cylinder intake pressure estimation device during the immediately preceding steady operation as an initial value when estimating the intake pressure downstream of the intake throttle valve during the transient operation of the engine.

3. The intake quantity sensing device as in claim 2, wherein
the intake pressure variation sensing device calculates the information about the intake pressure variation by comparing the intake quantity of the specific cylinder and the intake quantity of the other cylinder sensed with the intake quantity sensor during the steady operation of the engine, and
the each cylinder intake pressure estimation device corrects an average value of the intake pressure of the specific cylinder in a predetermined period sensed with the intake pressure sensor during the steady operation of the engine with the information about the intake pressure variation to calculate an average value of the intake pressure of each cylinder in a certain period.

4. The intake quantity sensing device as in claim 1, further comprising:
a control device that calculates a target opening degree of the intake throttle valve based on an accelerator operation amount and controls the intake throttle valve to conform an actual opening degree of the intake throttle valve to the target opening degree, wherein
the transient period intake quantity sensing device anticipates the intake pressure downstream of the intake throttle valve during the transient operation of the engine based on the target opening degree of the intake throttle valve with the use of a physics model and calculates the intake quantities of the respective cylinders based on the anticipated intake pressure and the information about the intake pressure variation.

* * * * *